(12) United States Patent
Nishida et al.

(10) Patent No.: US 9,431,929 B2
(45) Date of Patent: Aug. 30, 2016

(54) ASYNCHRONOUS FLUIDIC IMPULSE STRAIN-BASED ENERGY HARVESTING SYSTEM

(75) Inventors: Toshikazu Nishida, Gainesville, FL (US); David G. Bloomquist, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 367 days.

(21) Appl. No.: 13/979,210

(22) PCT Filed: Jan. 16, 2012

(86) PCT No.: PCT/US2012/021420
§ 371 (c)(1),
(2), (4) Date: Jul. 11, 2013

(87) PCT Pub. No.: WO2012/099814
PCT Pub. Date: Jul. 26, 2012

(65) Prior Publication Data
US 2013/0293068 A1 Nov. 7, 2013

Related U.S. Application Data

(60) Provisional application No. 61/433,319, filed on Jan. 17, 2011.

(51) Int. Cl.
*H02N 2/18* (2006.01)

(52) U.S. Cl.
CPC ............... *H02N 2/186* (2013.01); *H02N 2/18* (2013.01)

(58) Field of Classification Search
CPC .................... H01L 41/113; H01L 41/1132
USPC ................................. 310/338, 339
See application file for complete search history.

(56) References Cited

U.S. PATENT DOCUMENTS

| | | | | |
|---|---|---|---|---|
| 3,935,485 | A * | 1/1976 | Yoshida et al. | 310/339 |
| 5,122,787 | A * | 6/1992 | Fujita | G06F 3/0412 310/338 |
| 5,760,530 | A | 6/1998 | Kolesar | |
| 2005/0258717 | A1* | 11/2005 | Mullen | 310/339 |
| 2008/0013405 | A1 | 1/2008 | Moon et al. | |
| 2009/0002328 | A1 | 1/2009 | Ullrich et al. | |

FOREIGN PATENT DOCUMENTS

| | | |
|---|---|---|
| KR | 10-2010-0065816 | 6/2010 |
| WO | 2010081113 A1 | 7/2010 |

* cited by examiner

*Primary Examiner* — Derek Rosenau
(74) *Attorney, Agent, or Firm* — Saliwanchik, Lloyd & Eisenschenk

(57) ABSTRACT

Energy harvesting systems and devices are provided that harvest energy from external asynchronous force impulses using fluidic force transfer of the external force impulses to a plurality of compliant piezoelectric layers that seal a corresponding plurality of inner cavities. Each inner cavity can contain a compressible gas. Direct fluidic force transfer can be accomplished via a compressible or incompressible fluid between an external cover and the compliant piezoelectric layers.

25 Claims, 9 Drawing Sheets

ASYNCHRONOUS FLUIDIC IMPULSE STRAIN-BASED ENERGY HARVESTING SYSTEM

BACKGROUND OF THE INVENTION

Energy harvesting is the process by which ambient energy (energy derived from external sources) is captured and converted to electrical energy for powering devices. Remote sensor nodes must utilize energy harvesting of local, ambient energy sources for their power source in order to be untethered from the power grid or to avoid replacing batteries. Untethered sensor nodes have increased flexibility in their deployment. Local, ambient energy sources may include solar light, mechanical vibrations, mechanical strain, acoustic energy, temperature gradient, and electromagnetic energy at various frequencies including radio frequencies.

When solar light energy is not dependable (for example due to cloud cover) or is not available (for example due to embedded applications), the other energy sources must be considered for the energy harvesting applications. However, in many cases, ambient acoustic energy, RF energy, and thermal gradient-based energy are limited in magnitude and are often insufficient to power electronic circuits such as sensors, controllers, and transmitters. Although directed RF energy may possess sufficient energy to power such electronic circuits, the directed RF energy approach requires a focused RF source, not typically found in the local environment. Therefore, in certain situations, energy harvesting relies on mechanical vibration and strain.

Mechanical energy is typically harvested using a cantilever comprised of a proof mass (inertial mass) attached at an end of the cantilever. A cantilever-based vibration energy harvester relies on mechanical vibration at its base. This vibration causes a time varying acceleration of the base, which results in a mechanical strain in the cantilever beam due to the relative motion of the base with respect to the inertial proof mass. In a piezoelectric transduction-based cantilevered mechanical energy harvester, the mechanical strain in the cantilever is converted (harvested) into an electrical voltage by simultaneously straining a piezoelectric layer that is bonded to the cantilever structure. A piezoelectric transducer relies on mechanical strain where the strain generates a polarization charge density in the piezoelectric material and a resulting voltage across the electrodes spanning the piezoelectric layer. Such a cantilevered mechanical energy harvester that is excited by a time-varying base vibration is also termed a resonant energy harvester because the cantilever possesses a resonant frequency at which the cantilever tip deflection is maximum. One drawback of a cantilever-based vibration energy harvester is that the harvested energy decreases substantially if the vibration frequency does not closely match the resonant frequency of the cantilever.

Instead of a time-varying base mechanical vibration resulting in a time-varying strain in the cantilever and composite piezoelectric layer, a cantilever-based strain energy harvester may also convert a point load applied to its tip into a strain in a piezoelectric layer of the cantilever. However, cantilever-based strain energy harvesters have the disadvantage of a fixed base that impedes the application of the point load since the cantilever tip deflection stops when the tip touches the base. In addition, cantilever and other mechanical linkage methods of force transfer to the piezoelectric layer tend to be fragile and bulky due to the clearance necessary for the cantilever deflection or linkage displacement. Furthermore, the mechanical strain is proportional to the length of the cantilever, the magnitude of the proof mass, and the vibration amplitude. Therefore, miniaturization of the vibration energy harvester leads to a substantial decrease in the harvested energy. Hence, vibration-based energy harvesters have limitations in their applicability for small size applications.

BRIEF SUMMARY

Energy harvesting systems and devices are provided that harvest energy from external asynchronous force impulses using fluidic force transfer of the external force impulses to a plurality of compliant piezoelectric layers that seal a corresponding plurality of inner cavities.

According to certain embodiments of the invention, in contrast to vibration-based energy harvesters, a large external force can be used to induce significant strain in a piezoelectric layer, resulting in being able to harvest substantial energy in a manufacturable method with small form factor.

Embodiments of the invention operate asynchronously, in a non-resonant manner, in response to aperiodic as well as periodic external force impulses.

According to certain embodiments, macro-scale systems can be implemented for energy harvesting. The macro-scale systems can include, but are not limited to, an energy harvesting floor, energy harvesting roadway stripes, energy harvesting in bridges and structures, and energy harvesting in balls and other deformable objects in a macro-scale implementation.

According to another embodiment, micro-scale systems can be fabricated for energy harvesting in applications including, but not limited to, energy harvesting keypads and keyboards. In addition, a micro-scale asynchronous fluidic impulse-based energy harvester device can be used as a tactile (touch) sensor.

DETAILED DISCLOSURE

Energy harvesting systems and devices are provided that harvest energy from external asynchronous force impulses using fluidic force transfer of the external force impulses to a plurality of compliant piezoelectric layers that seal a corresponding plurality of inner cavities. Each inner cavity can contain a compressible gas.

An energy harvester in accordance with an embodiment of the invention includes a top layer of a wear-resistant compliant cover over a plurality of cavities having compressible gas sealed therein with a piezoelectric membrane. In operation, force exerted on the top layer acts upon a fluid between the top layer and the cavity layer containing the compressible gas that functions as a fluidic spring, which transfers the force to the piezoelectric membranes. The resulting strain in the piezoelectric membranes produces an electric voltage through the piezoelectric effect. Specifically, asynchronous external force impulses produce fluidic impulses which are transferred to internal piezoelectric membrane arrays for harvesting energy.

Figure 1:
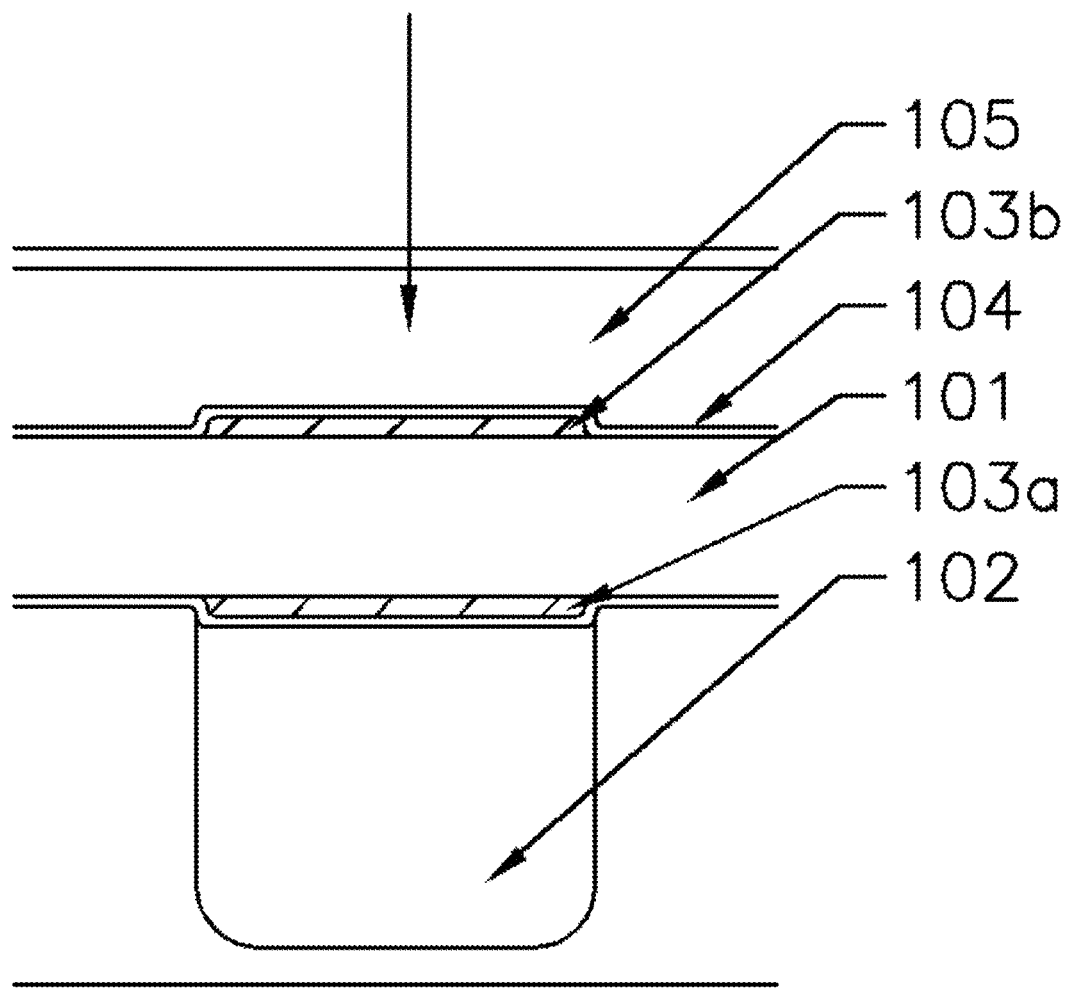
FIG. 1 shows a cross-sectional diagram of a vibration energy harvester configuration in accordance with an embodiment of the invention.

According to the invention, energy from external asynchronous force impulses is harvested using fluidic force transfer to a compliant piezoelectric layer sealing an inner cavity. FIG. 1 shows a cross-sectional view of an energy harvester in accordance with an embodiment of the invention. Referring to FIG. 1, a piezoelectric layer 101 is disposed over a cavity 102. The piezoelectric layer 101 can be, for example, a polymer piezoelectric such as polyvinylidene fluoride (PVDF), a ceramic piezoelectric such as lead zirconate titanate (PZT), a macrofiber composite (MFC), or other implementations of a layer possessing piezoelectric properties.

The cavity 102 can contain compressible gas such as air trapped in the cavity during manufacture. Electrodes 103a and 103b are formed on the top surface and bottom surface, respectively, of the piezoelectric layer over the cavity 102. A passivation layer 104 may be formed on the piezoelectric layer to protect the electrodes 103a and 103b. The sizes and shapes of the cavity 102 can vary according to particular application and implementation of the energy harvester. In addition, the electrodes 103a and 103b can have shapes that correspond to the shape of the opening of the cavity 102. For example, a circular cavity can have corresponding circular electrodes. In another embodiment, the electrodes 103a and 103b can be shaped differently than the shape of the opening of the cavity 102. For example, polygonal electrodes can be disposed over a circular cavity. It should also be understood that the alignment of the electrodes 103a and 103b with the cavity 102 is not critical. A fluid layer 105 on the piezoelectric layer 101 transfers an external force impulse onto the piezoelectric layer 101, resulting in a strain to the piezoelectric layer and a voltage potential across the electrodes 103a and 103b.

In accordance with certain embodiments of the invention, the cavity is provided in plurality and can be arranged as an array of cavities in a plastic or other non-conductive material layer. In one embodiment, the cavities each have the same size and/or shape. In another embodiment, the cavities can have one or more different sizes and/or shapes.

Figure 2A:
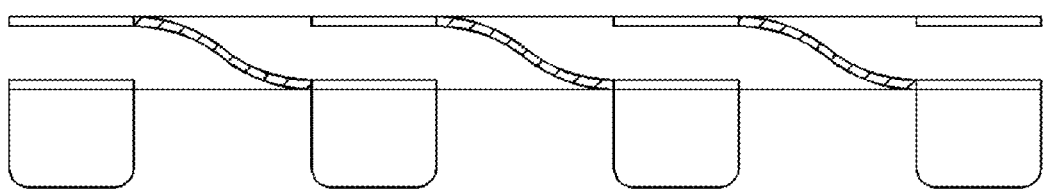
FIGS. 2A-2C show electrode connection configurations in accordance with certain embodiments of the invention.
Figure 2B:
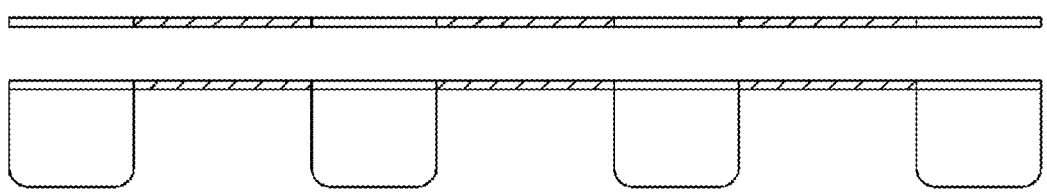
Figure 2C:
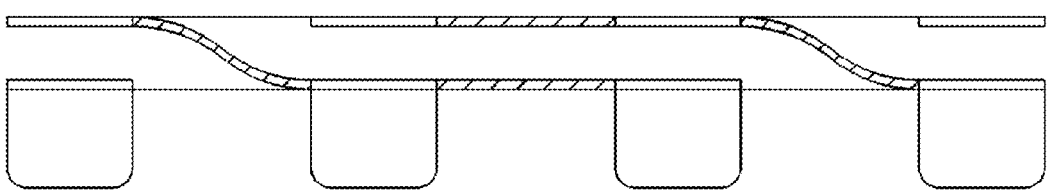

The electrodes over each cavity can be connected to a common top electrode and a common bottom electrode. Because the fluidic impulse is applied in one direction, each cavity's electrode pair has a same polarity. The connections can be parallel, series, or a combination of parallel and series connections, such as shown in FIGS. 2A, 2B, and 2C. For example, when the voltage across a cavity's top/bottom electrode pair is small and a larger voltage is desired across the common top electrode and common bottom electrode, series connections such as shown in FIG. 2A are used. When the voltage across a cavity's top/bottom electrode pair is sufficiently large, parallel connections, such as shown in FIG. 2B, can be sufficient to achieve a desired voltage across the common top electrode and common bottom electrode. Combinations of serial and parallel connections can also be used, such as shown in FIG. 2C.

Instead of primarily relying on mechanical vibrational energy where such harvesters operate best at a synchronous vibrational frequency that closely matches the resonant frequency of the harvester, embodiments of the invention operate asynchronously, in a non-resonant manner, in response to aperiodic as well as periodic external force impulses.

In addition, according to certain embodiments, a low-profile fluidic force transfer mechanism is used to harvest the asynchronous vibrational energy. The low profile is accomplished by using three main layers—a cavity layer with a plurality of cavities, a piezoelectric layer, and a fluid layer. A protective cover is disposed over the fluid layer and receives the external impact.

The fluid layer can be contained by the piezoelectric layer, rigid outer walls and the protective cover. The fluid layer can be a gas or a liquid, and can be selected according to the particular implementation environment. Similarly, the particular piezoelectric layer material can be selected according to the implementation environment and the fluid layer. The fluid layer may contact the piezoelectric layer directly in one or more regions and, therefore, can be selected so as to not adversely interact with or corrode the material of the piezoelectric layer. In certain embodiments, a passivation layer can be used to inhibit direct contact between the fluid and the piezoelectric material.

The selected fluid of the fluid layer can determine the lower end of the available temperature ranges and the selected piezoelectric layer's Curie temperature can determine the upper end of the available temperature ranges.

Figure 3:
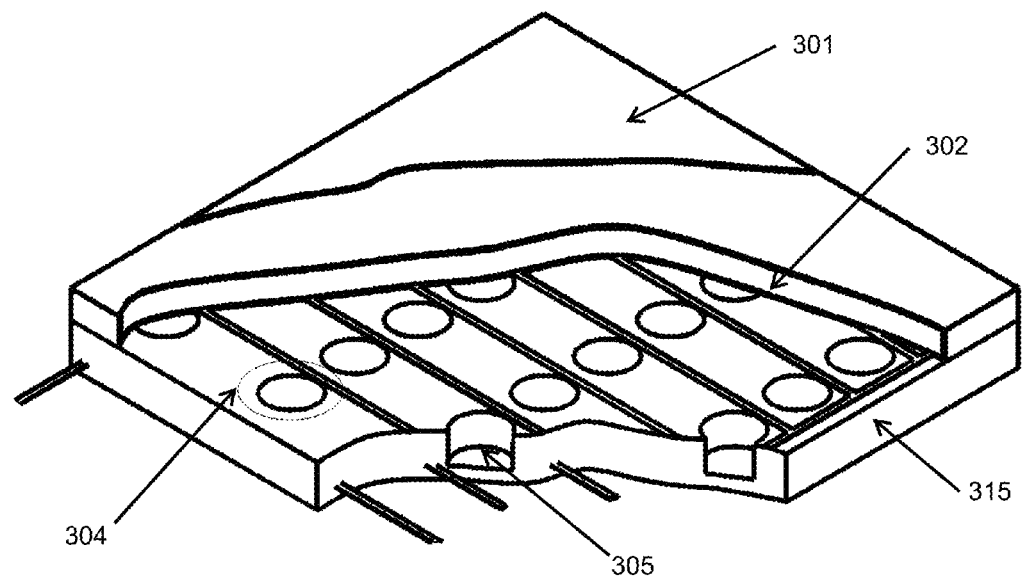
FIG. 3 shows a cut-away view of an asynchronous fluidic impulse-based energy harvesting device in accordance with an embodiment of the invention with compressible gas in bottom cavity and compressible gas in top layer.

According to one embodiment, a compressible fluid is disposed between a top layer and the cavity layer. The compressible fluid acts to dampen the force transfer. Dampening may be useful when there is more than sufficient external force, for example, in the case where the external force corresponds to the weight of a 70 kg adult at 1 g or 700N, in which case the dampening acts to cushion the surface. For, example, referring to FIG. 3, force exerted on a wear-resistant compliant cover 301 acts upon the compressible fluid 302 in the top layer below the cover 301, which is then transferred to the compliant piezoelectric membranes 304 that seal cavities 305 in the cavity layer 315.

According to another embodiment, an incompressible fluid is disposed between the top layer and the cavity layer. One example of an incompressible fluid is water. The incompressible fluid maximizes the force transfer to the compliant piezoelectric membranes that seal the cavities. Thus, referring to FIG. 4, force exerted on the wear-resistant compliant cover 401 acts upon the incompressible fluid 403 and is transferred to the compliant piezoelectric membranes 404.

In accordance with an embodiment of the invention, a macro-scale asynchronous fluidic impulse-based energy harvesting device can be formed of four layers: a cavity layer, a piezoelectric membrane layer, a fluid-filled cavity layer, and a cover layer. A plurality of these devices can be used. In certain embodiments, a plurality of devices can be connected to each other to provide a combined power supply, particularly where external impact(s) can occur simultaneously over areas larger than the size of one device.

Figure 5:
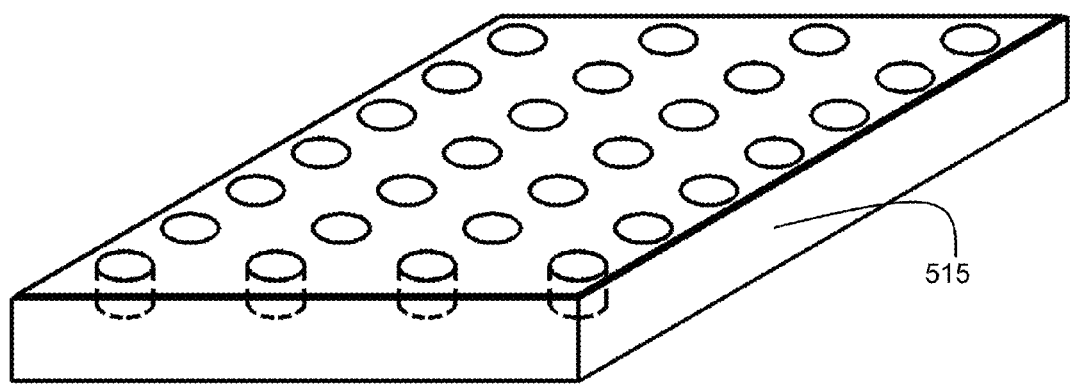
FIGS. 5-8 show diagrams illustrating a method of fabricating an asynchronous fluidic impulse-based energy harvesting device in accordance with an embodiment of the invention.

As shown in FIG. 5, a cavity layer 515 of a macro-scale asynchronous fluidic impulse-based energy harvesting device with compressible gas can be fabricated by, for example, injection molding or stamping of plastics or other moldable material. In another embodiment, the cavities and conducting traces that connect the piezoelectric electrodes can be formed in a printed circuit board layer.

Figure 6:
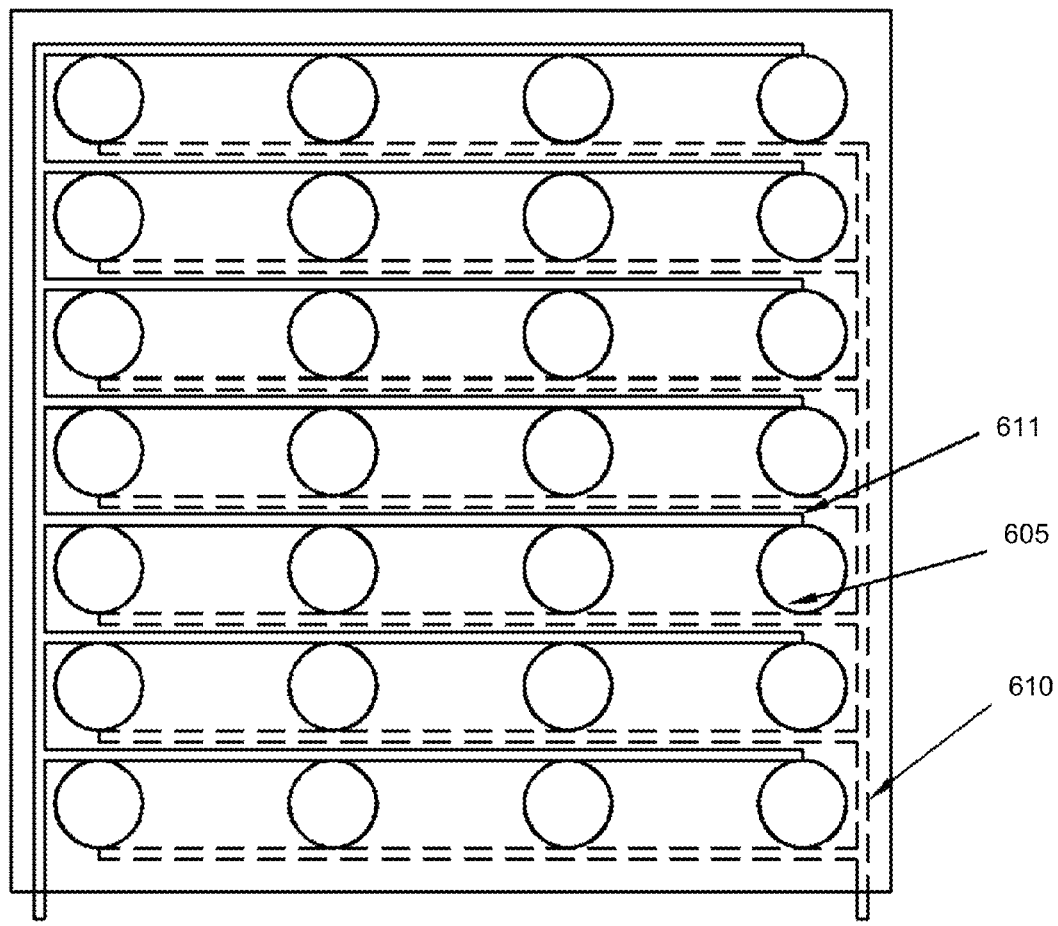

Referring to the plan view shown in FIG. 6, a compliant piezoelectric membrane (not shown) such as PVDF can be placed on top of the cavities 605, sealing the cavities. A compressible gas can be sealed within each cavity 605. For example, air can be sealed within each cavity by adhering the piezoelectric membrane to the cavity layer. For example, the piezoelectric membrane can be attached using an adhesive. As another example, a lamination process can be performed to fuse the piezoelectric membrane to the cavity layer.

The piezoelectric layer can have pliable conductive electrodes formed thereon to correspond to the cavities of the cavity layer 515. In addition, a first set of conductive traces 610 can be formed on a lower surface of the piezoelectric membrane to connect each piezoelectric membrane-covered cavity to a bottom electrode. Another set of conductive traces 611 can be formed on a top surface of the piezoelectric membrane to connect each piezoelectric membrane-covered cavity to a top electrode. The conductive electrodes and/or conductive traces can be formed by printing methods, plating methods, printed circuit board methods or any other suitable deposition methods.

Figure 7:
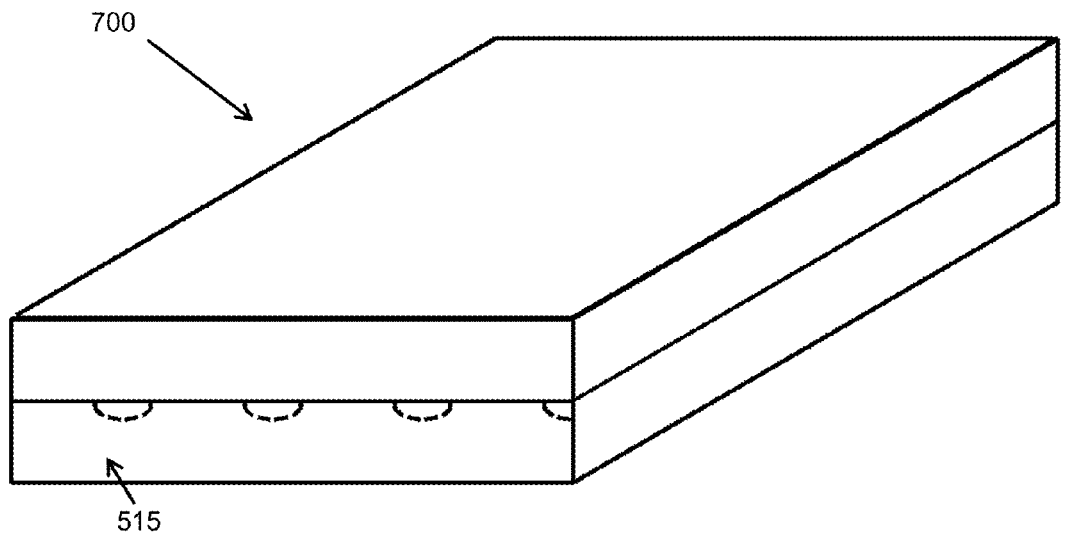

Referring to FIG. 7, an incompressible (or compressible) fluid-filled cavity 700 can be laminated or attached on top of the compliant piezoelectric membrane-sealed bottom cavities 515. The fluid-filled cavity can allow the fluid to cover an array of the piezoelectric membrane-sealed cavities. In one embodiment, rigid walls to contain the fluid layer and form the cavity for the fluid layer can be provided by the cavity layer. In such an embodiment, the piezoelectric membrane can be fitted within the rigid walls of the cavity layer and provide the bottom surface of the cavity. Advantageously, a single member can provide an integrated top fluid cavity and an array of fluidic cavities. A piezoelectric membrane can seal a compressible fluid in the array of fluidic cavities and a fluid can be provided in the top fluid cavity over the piezoelectric membrane.

Figure 8:
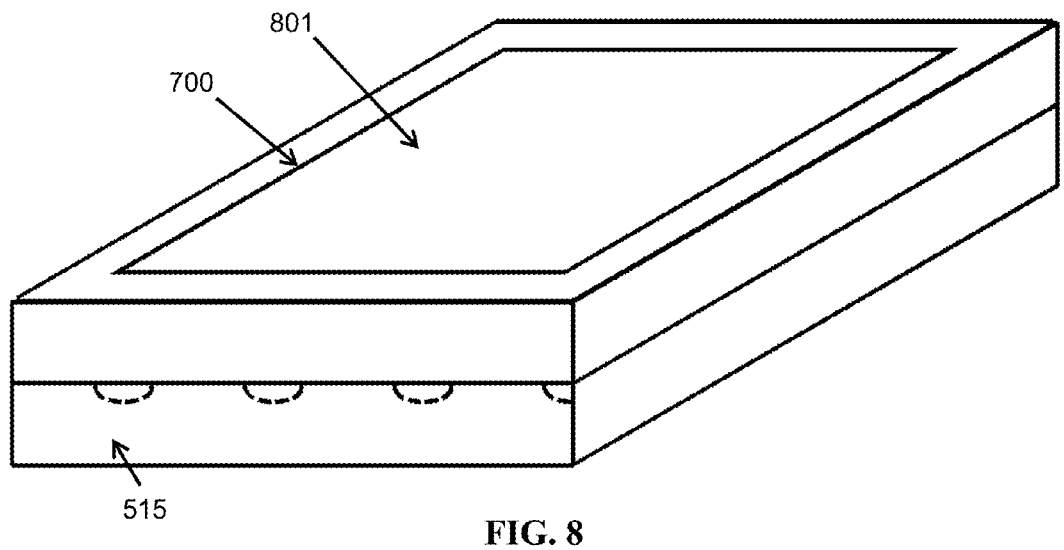

Then, referring to FIG. 8, a wear-resistant layer 801 can be attached to the top of the fluid-filled cavity 700 and can seal the fluid-filled cavity. The wear-resistant layer can be flexible to enable the transfer of the applied external force per area to the top cavity, and in turn to the piezoelectric composite membrane-sealed bottom cavities. In certain embodiments, the cavity layer and wear-resistant layer are sufficiently deformable to enable application to curved surfaces, such as a hand grip or curb.

Figure 9A:
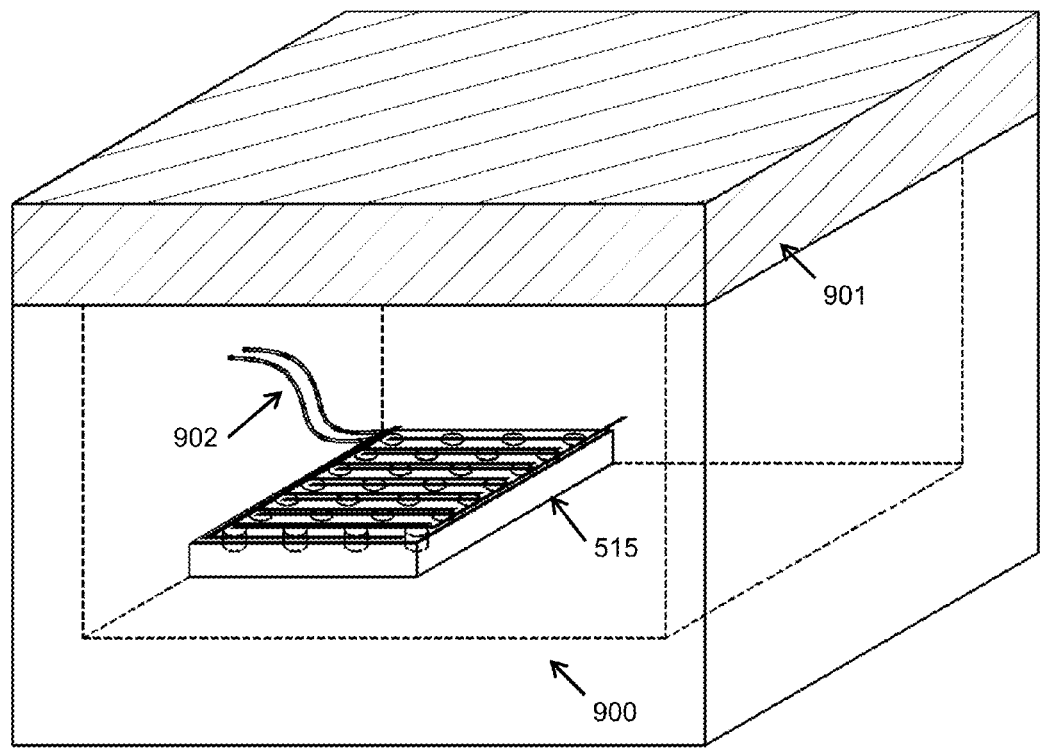
FIGS. 9A and 9B show implementations of an asynchronous fluidic impulse-based energy harvesting device in accordance with certain embodiments of the invention.

In another embodiment as shown in FIG. 9A, the piezoelectric film-sealed cavity layer 515 may be suspended in a fluidic cavity 900 sealed by a macro-scale wear-resistant layer 901 instead of serving as the base of the fluidic cavity 900 containing the incompressible or compressible fluid. The piezoelectric film-sealed cavity layer 515 can be tethered to an interior wall of the wear-resistant layer-sealed fluidic cavity 900 by conducting traces 902 connected to the electrodes. In one embodiment, the conducting traces 902 may be the only means for keeping the piezoelectric film-sealed cavity in place. Although the tethered traces 902 are shown as extending from a central region of a side of the cavity, embodiments are not limited thereto. For example, the traces 902 can extend from a lower portion of a sidewall, a top of a sidewall, or a bottom surface of the cavity.

Figure 9B:
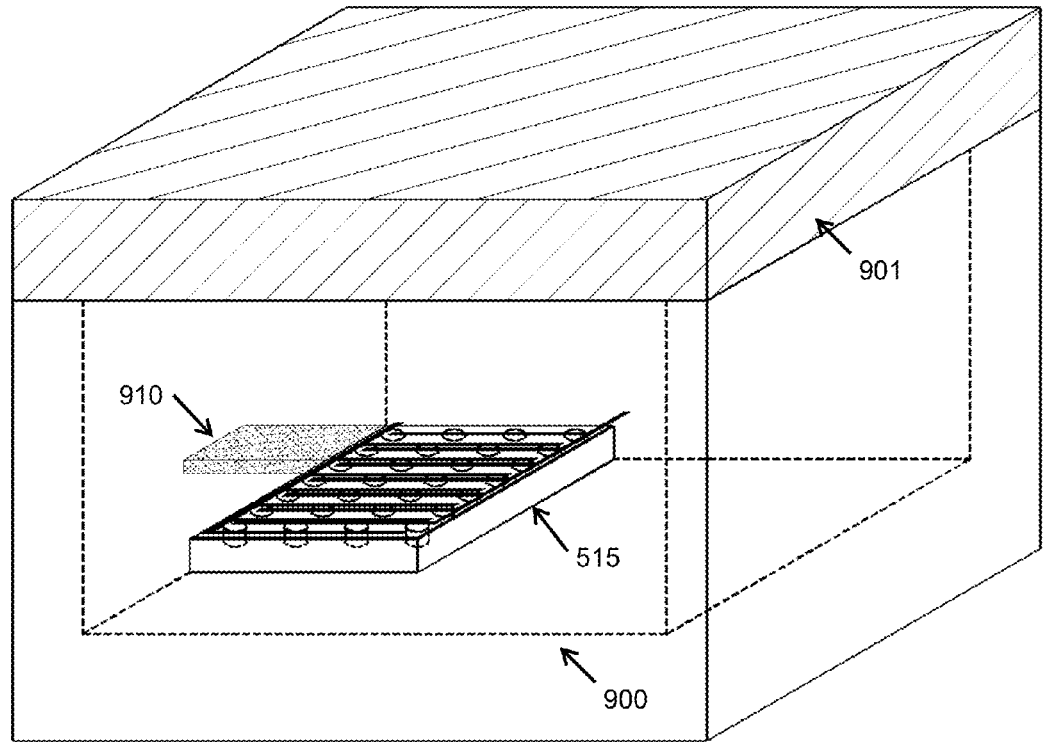

In a further embodiment, such as shown in FIG. 9B, additional devices 910 can be provided with the piezoelectric film-sealed cavity layer 515 suspended in the fluidic cavity 900. For example, a sensor/controller, energy storage, and/or wireless transmitter can be integrated with the piezoelectric film-sealed cavity layer 515. The additional devices can be fabricated on a same substrate as the cavity layer 515 or fabricated separately and then later connected and/or attached to the cavity layer 515.

Embodiments of the subject asynchronous fluidic impulse-based energy harvesting device can be implemented wherever an external force is present.

Figure 10:
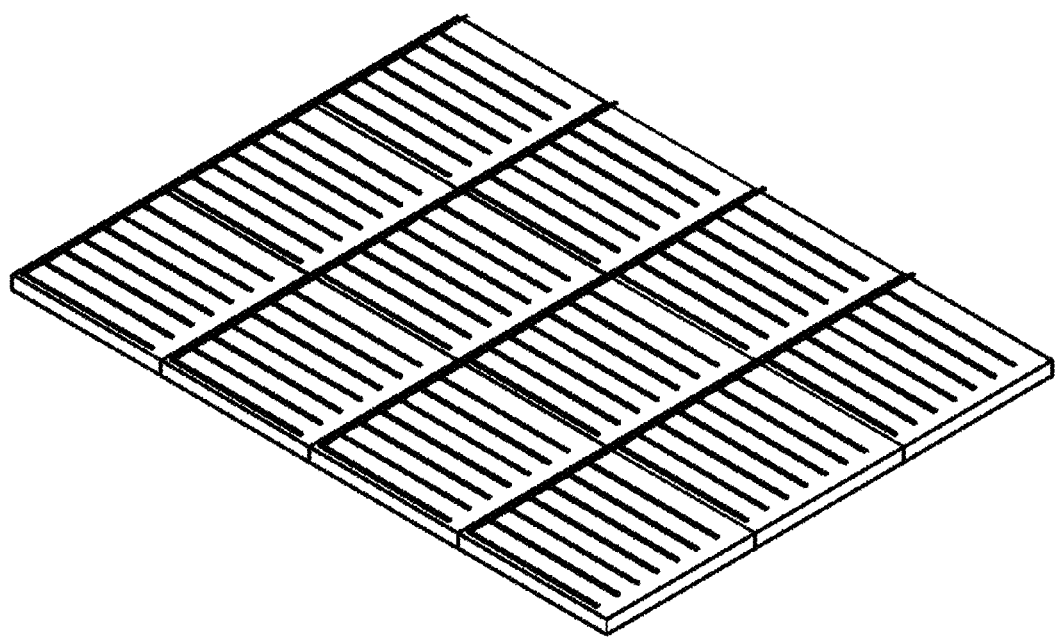
FIG. 10 shows one implementation of an asynchronous fluidic impulse-based energy harvester in accordance with an embodiment of the invention.

According to one embodiment of the invention, the subject asynchronous fluidic impulse-based energy harvester can be implemented as compact energy harvesting floor tiles to replace conventional floor tiles. For example, referring to FIG. 10, because the subject asynchronous fluidic impulse-based energy harvester can be fabricated with a low profile, it can be used as an energy harvesting floor covering, such as a floor tile or a carpet tile. The asynchronous fluidic impulse-based energy harvester can have the same profile as existing tiles on a floor and may replace one or all of the tiles.

Each floor tile can include a decorative or non-decorative compliant cover and can include electronic components including but not limited to a storage element, regulator, and electronic load (e.g., a device being powered such as a sensor, transmitter, light source, or other device). In certain embodiments, the floor tiles can allow connection of electrodes between adjacent tiles in order to provide combined power output. For example, interlocking tiles can be provided.

As one example application of the floor tiles, the energy collected by the subject energy harvesting floor tiles from foot traffic may be used to power sensors to detect accidents such as falls. An RF or other frequency transmitter can be included in the tile to transmit a signal to the sensor detecting the accident and/or be used to transmit a signal from the sensor detecting the accident to an external system. Another example application is to light hallways during night-time, which can be used as a safety feature and/or energy saving feature. Light emitting devices can be integrated with the tiles to receive the power from the tiles or a sensor integrated with and powered by the subject energy harvesting tile can determine that foot traffic is occurring and a signal transmitted by a transmitter also integrated in the tile and powered by the subject energy harvesting tile can be used to cause a light in the area to turn on. A similar mechanism can be used for intruder detection, where the tile can incorporate electronics to sense and transmit a signal indicating that the tile was stepped on.

Energy harvesting floor tiles in accordance with an embodiment of the invention are advantageous over other energy harvesting floor tiles due to the compact low-profile structure, robustness, and ease of manufacture.

Figure 11:
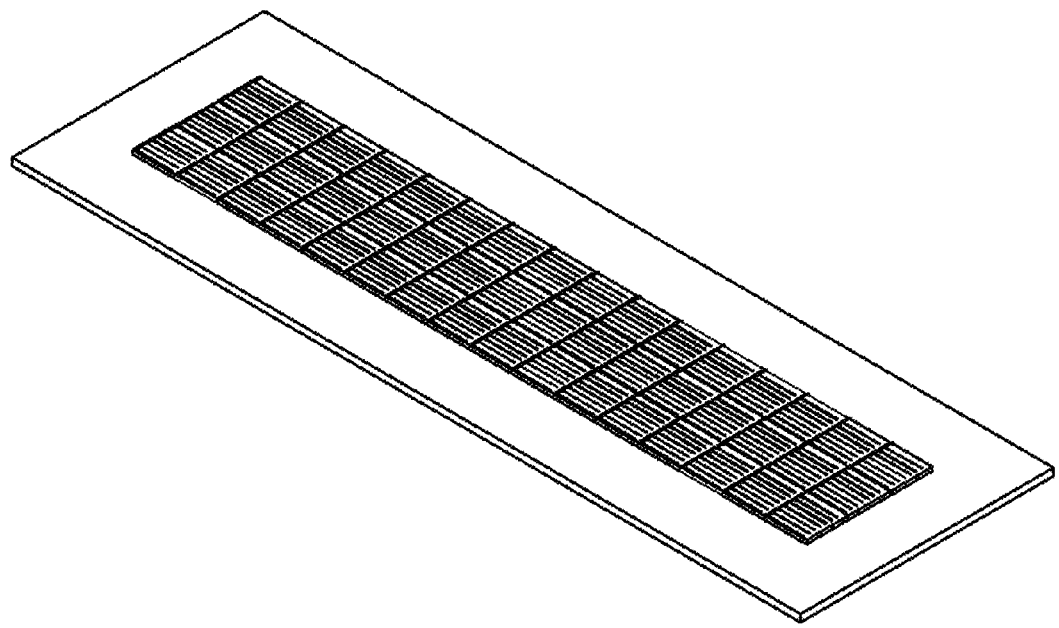
FIG. 11 shows another implementation of an asynchronous fluidic impulse-based energy harvester in accordance with an embodiment of the invention.

Another application of the macro-scale asynchronous fluidic impulse-based energy harvester is for a roadway for vehicular traffic. Considerable external force is present on a roadway or bridge surface. Referring to FIG. 11, the subject asynchronous fluidic impulse-based energy harvester can be provided on or embedded in the pavement of a roadway or bridge. According to one embodiment, the macro-scale asynchronous fluidic impulse-based energy harvester can be used in low-profile vehicular traffic-based energy harvesting roadway stripes located on the median, lane markers, or the road shoulder. The energy collected from the traffic-powered roadway energy harvester can be used to power roadway sensors to monitor traffic levels, wireless beacons, and safety devices for many transportation applications.

These energy harvesting roadway stripes are advantageous over other energy harvesting approaches due to the compact low-profile structure, robustness, and ease of manufacture and concomitant low cost. In addition, the subject device and materials can be scaled to accommodate the heavy loads.

The subject asynchronous fluidic impulse-based energy harvester device is applicable to both macro-scale devices and micro-scale devices. For example, a MEMS asynchronous fluidic impulse-based energy harvester device can be fabricated using standard micromachining techniques. For example, the cavity layer (similar to 515 in FIG. 5) can be fabricated as a micro-scale device by etching a semiconductor such as silicon to form the cavities. Electrodes can be formed by depositing and patterning by, for example, lift-off conductive material such as metal on the semiconductor cavity layer. A piezoelectric material can be formed on the semiconductor cavity layer, sealing compressible gas into the cavities of the cavity layer. A top electrode and conductive traces can be deposited on the piezoelectric material before laminating or attaching an incompressible fluid filled cavity onto the piezoelectric material. A protective layer can be formed on the fluid filled cavity layer by deposition or lamination.

Figure 12:
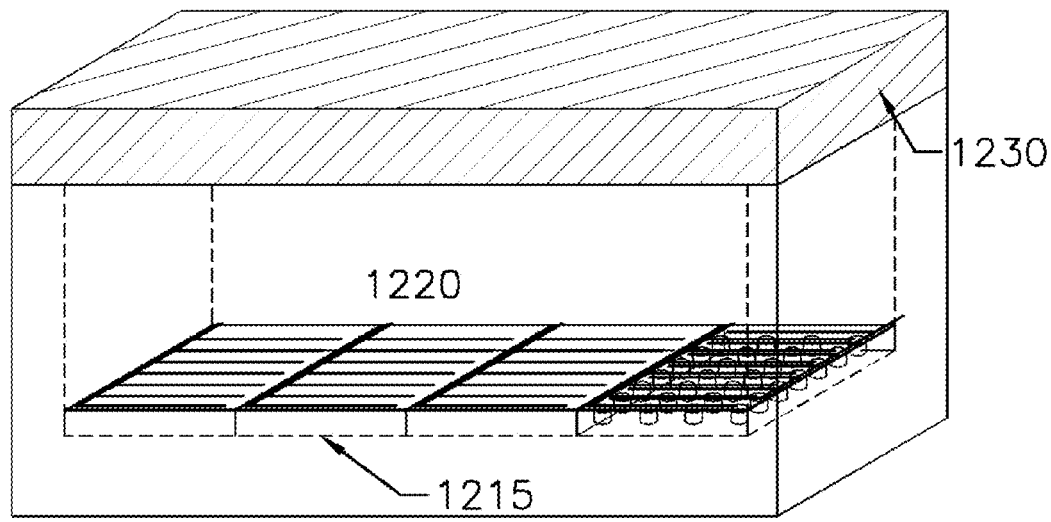
FIG. 12 shows an implementation of a hybrid micro- and macro-scale asynchronous fluidic impulse-based energy harvesting device in accordance with an embodiment of the invention.

A hybrid micro- and macro-scale fluidic impulse-based energy harvester can also be provided. For example, in one embodiment as shown in FIG. 12, a micro-scale device portion of an array of micromachined cavities sealed with a piezoelectric layer can be bonded to a macro-scale fluidic chamber 1220 filled with an incompressible fluid and topped with a wear-resistant layer 1230. In certain embodiments, the bottom of the fluidic chamber can be provided with a plurality of micro-scale tiles (1215) of the array of micromachined cavities. In another embodiment such as described with respect to FIG. 9A, a micro-scale device portion of an array of micromachined cavities sealed with a piezoelectric layer can be suspended in the macro-scale fluidic chamber. Also, as described with respect to FIG. 9B, additional device elements can be suspended in the macro-scale fluidic chamber with the piezoelectric film sealed cavity layer.

Conventional microelectromechanical system (MEMS)-based mechanical vibrational energy harvesting devices tend to have a small harvestable energy due to the small size of the proof mass and a high resonant frequency. Advantageously, embodiments of the subject invention utilize an external force, which increases the harvestable energy as compared to the conventional resonant cantilever-based MEMS devices. In addition, the asynchronous operation of embodiments of the invention does not rely on resonant frequency matching.

The MEMS or hybrid micro-/macro-scale asynchronous fluidic impulse-based energy harvesting system can be employed as a force sensor. For example, the subject MEMS or hybrid micro-/macro-scale device can be implemented as a tactile touch sensor. When the MEMS or hybrid micro-/macro-scale device is touched, the force impact of the touch is transferred to the piezoelectric membranes over the cavities via the fluid layer to produce a voltage indicating that the element was touched.

According to another embodiment, the subject MEMS or hybrid micro-/macro-scale device can be used as a small external force-based energy harvesting system, such as a self-powered keypad or keyboard. The impact of a person's fingers on the keypad or keyboard keys can be harvested and used to power the keypad or keyboard.

A greater understanding of the present invention and of its many advantages may be had from the following example, given by way of illustration. The following example should not be considered in any way limitative of the invention. Numerous changes and modifications can be made with respect to the invention.

EXAMPLE

Figure 4:
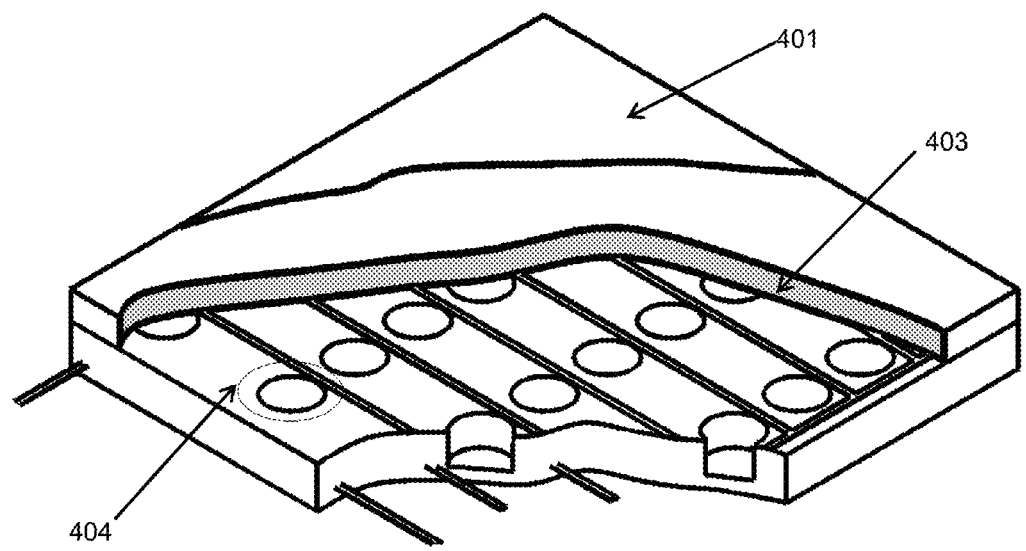
FIG. 4 shows a cut-away view of an asynchronous fluidic impulse-based energy harvesting device in accordance with an embodiment of the invention with compressible gas in bottom cavity and incompressible fluid in top layer.
Figure 13:
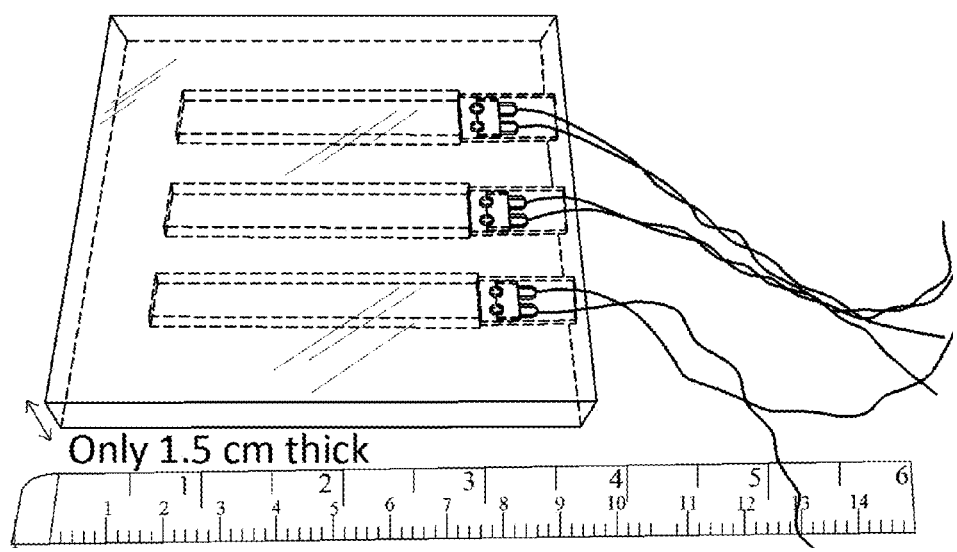
FIG. 13 shows a photograph of a prototype example of an asynchronous fluidic impulse-based energy harvesting device in accordance with an embodiment of the invention.
Figure 14:
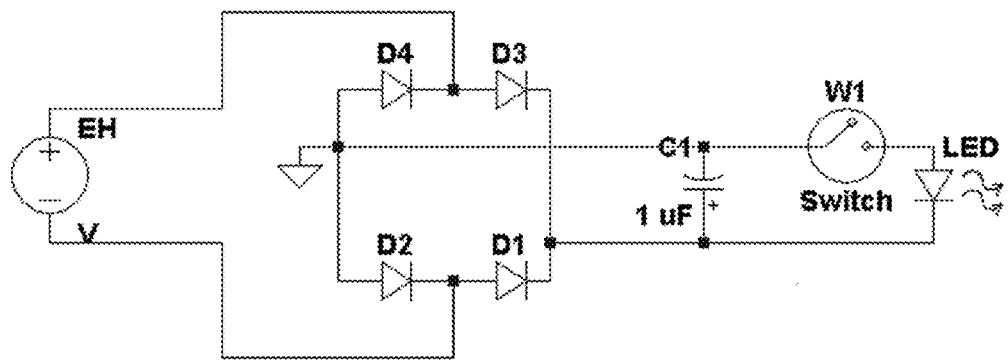
FIG. 14 shows a schematic of an energy storage circuit for the prototype in accordance with an embodiment of the invention.
Figure 15:
FIG. 15 shows a plot of the response to a heel strike upon the prototype.

A prototype macro-scale asynchronous fluidic impulse based energy harvester in accordance with an embodiment shown in FIG. 4 was fabricated using a 0.236 inch thick clear cast acrylic, incompressible fluid, PVDF piezoelectric film, a 0.12 inch thick vinyl wear surface, and an adhesive. FIG. 13 shows a photograph of the prototype. A rectifier and capacitor were used to store energy, and a LED load was included to illustrate that the energy harvested by the prototype was able to light the LED. FIG. 14 shows a schematic of the circuit. FIG. 15 shows a plot of the greater than 10V pulse created with a heel strike to the prototype.

The prototype illustrates the working principles of the asynchronous fluidic impulse based energy harvester in accordance with an embodiment of the invention. The working prototype was in the form of a 16 mm×73 mm PVDF film floor tile. A 1 µF capacitor was charged to approximately 1V per foot strike, resulting in 0.5 µJ/foot strike. As a rough estimate, a 12 in×12 in floor tile covered by the same inefficient 16 mm×73 mm PVDF film and receiving the 0.5 µJ/foot strike, can result in an about 40 µJ/foot strike $$\left(E \cong \frac{30.48^2 \text{ cm}^2}{1.6 \times 7.3 \text{ cm}^2} \times 0.5 \text{ µJ}/footstrike\right),$$

which is sufficient for low power electronics, sensing, and periodic wireless transmission.

It should be understood that the energy harvesting capabilities are also dependent on the selected piezoelectric materials, load transfer, power processing (e.g., power boost converter), and applied load.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. An asynchronous fluidic impulse-based energy harvester comprising:
    a first cavity layer comprising a plurality of open cavities;
    a piezoelectric membrane layer on the first cavity layer and sealing each of the open cavities;
    a fluid layer on the piezoelectric membrane layer confined by a second cavity layer;
    a cover layer on the fluid layer; and
    a passivation layer disposed between the piezoelectric membrane layer and the fluid layer,
    wherein the fluid layer is a continuous layer that covers the plurality of open cavities.

2. The asynchronous fluidic impulse-based energy harvester according to claim 1, wherein the fluid layer comprises a compressible fluid.

3. The asynchronous fluidic impulse-based energy harvester according to claim 1, wherein the fluid layer comprises an incompressible fluid.

4. The asynchronous fluidic impulse-based energy harvester according to claim 1, wherein a compressible gas is disposed in each of the piezoelectric membrane layer-sealed cavities.

5. The asynchronous fluidic impulse-based energy harvester according to claim 1, wherein the cover layer is a wear-resistant compliant layer.

6. The asynchronous fluidic impulse-based energy harvester according to claim 1, wherein the fluid layer is filled between and kept in place by a rigid wall, the piezoelectric membrane layer, and the cover layer.

7. The asynchronous fluidic impulse-based energy harvester according to claim 1, further comprising:
    a plurality of first electrodes on a lower surface of the piezoelectric membrane layer disposed above each cavity; and
    a plurality of second electrodes on a top surface of the piezoelectric membrane layer corresponding to each of the plurality of first electrodes.

8. The asynchronous fluidic impulse-based energy harvester according to claim 7, further comprising:
    a first set of conductive traces on the lower surface of the piezoelectric membrane layer to connect at least one first electrode to a bottom electrode, and
    a second set of conductive traces on the top surface of the piezoelectric membrane layer to connect at least one second electrode to a top electrode.

9. The asynchronous fluidic impulse-based energy harvester according to claim 7, wherein the plurality of open cavities of the first cavity layer are etched in a printed circuit board, and wherein printed circuit board traces provide electrical contacts to the first electrodes and second electrodes.

10. The asynchronous fluidic impulse-based energy harvester according to claim 7, wherein the first cavity layer having the piezoelectric membrane layer thereon is suspended in the second cavity and is tethered to the second cavity by conducting traces connected to the first electrodes and the second electrodes.

11. The asynchronous fluidic impulse-based energy harvester according to claim 10, further comprising a controller, energy storage device, and/or wireless transmitter integrated with the first cavity layer and suspended in the second cavity with the first cavity layer.

12. The asynchronous fluidic impulse-based energy harvester according to claim 1, wherein the first cavity layer is made of at least one of an injection molding, a stamped plastic, and a moldable material.

13. A floor tile comprising the asynchronous fluidic impulse-based energy harvester of claim 12.

14. A detection system comprising the floor tile of claim 13, and a sensor powered by the floor tile.

15. A roadway stripe comprising the asynchronous fluidic impulse-based energy harvester of claim 12.

16. A traffic safety system comprising the roadway stripe of claim 15, a roadway sensor powered by the roadway stripe for monitoring traffic levels, and a wireless beacon powered by the roadway stripe.

17. The asynchronous fluidic impulse-based energy harvester according to claim 1, wherein the asynchronous fluidic impulse-based energy harvester is a micro-scale microelectromechanical system (MEMS) device.

18. A tactile touch sensor comprising the asynchronous fluidic impulse-based energy harvester of claim 17.

19. A self powered keyboard comprising the asynchronous fluidic impulse-based energy harvester of claim 17.

20. The asynchronous fluidic impulse-based energy harvester according to claim 1, wherein the first cavity layer with the piezoelectric membrane layer sealing each of the open cavities of the first cavity layer is located in a fluidic chamber formed by the fluid layer, and
    wherein the fluidic chamber is filled with an incompressible fluid.

21. A tactile touch sensor comprising the asynchronous fluidic impulse-based energy harvester of claim 20.

22. A self powered keyboard comprising the asynchronous fluidic impulse-based energy harvester of claim 20.

23. The asynchronous fluidic impulse-based energy harvester according to claim 20
    wherein the first cavity layer with the piezoelectric membrane layer sealing each of the open cavities of the first cavity layer is suspended in the fluidic chamber.

24. A tactile touch sensor comprising the asynchronous fluidic impulse-based energy harvester of claim 23.

25. A self powered keyboard comprising the asynchronous fluidic impulse-based energy harvester of claim 23.

* * * * *